US012504135B1

(12) United States Patent
Deng

(10) Patent No.: US 12,504,135 B1
(45) Date of Patent: Dec. 23, 2025

(54) LIGHT STRING

(71) Applicant: Miaoyin Deng, Guangdong (CN)

(72) Inventor: Miaoyin Deng, Guangdong (CN)

( * ) Notice: Subject to any disclaimer, the term of this patent is extended or adjusted under 35 U.S.C. 154(b) by 0 days.

(21) Appl. No.: 19/263,579

(22) Filed: Jul. 9, 2025

(30) Foreign Application Priority Data

Mar. 5, 2025 (CN) ......................... 202520378752.5

(51) Int. Cl.
*F21S 4/10* (2016.01)
*F21V 19/00* (2006.01)
*F21V 23/00* (2015.01)

(52) U.S. Cl.
CPC ............ *F21S 4/10* (2016.01); *F21V 19/0025* (2013.01); *F21V 23/002* (2013.01)

(58) Field of Classification Search
CPC ...... F21V 19/0025; F21V 23/002; F21S 4/10; H10H 29/922; H10H 29/857; H05B 45/345; H05B 45/42
See application file for complete search history.

(56) References Cited

U.S. PATENT DOCUMENTS

2002/0149938 A1* 10/2002 Allen .................. F21V 19/0025 362/249.14
2005/0213321 A1* 9/2005 Lin ........................ H05B 45/00 362/231
2021/0003275 A1* 1/2021 Grave .................. H05B 47/155
2022/0099257 A1* 3/2022 Liu ..................... F21V 19/0025

FOREIGN PATENT DOCUMENTS

CN 213272133 U 5/2021

* cited by examiner

*Primary Examiner* — Zheng Song
*Assistant Examiner* — James M Endo
(74) *Attorney, Agent, or Firm* — Cooper Legal Group LLC

(57) ABSTRACT

A light string, including a power supply cord and circuit boards. The power supply cord has welding portions, and each circuit board is welded to a corresponding set of welding portions. The power supply cord includes a first, a second, and a third wire. Each circuit board is arranged with a first, a second, and a third light-emitting element; a positive electrode of the first light-emitting element is connected to the first wire, and a negative electrode is connected in parallel to the second wire and the third wire; a positive electrode of the second light-emitting element is connected to the second wire, and a negative electrode is connected in parallel to the first wire and the third wire; a positive electrode of the third light-emitting element is connected to the third wire, and a negative electrode is connected in parallel to the first wire and the second wire.

12 Claims, 11 Drawing Sheets

LIGHT STRING

CROSS-REFERENCE TO RELATED APPLICATIONS

The application claims priority of Chinese patent application 202520378752.5, filed on Mar. 5, 2025, which is incorporated herein by reference in its entirety.

TECHNICAL FIELD

The present disclosure relates to the technical field of lighting equipment, and more specifically to a light string.

BACKGROUND

A light string is a tool including multiple luminous units interconnected via a power supply cord to collectively achieve illumination and decorative effects. This tool finds applications in settings such as eaves and tents. In the related art, the light string incorporates multiple sets of power supply cords. The positive electrode and negative electrode of every luminous unit must be individually soldered to a distinct set of power supply cords. Consequently, multiple sets of power supply cords must be prepared, and welding operations are executed separately at both the positive and negative electrodes. This necessitates an increased number of solder joints, thereby significantly impeding assembly efficiency. Furthermore, each set of power supply cords includes multiple wires. The number of wires corresponds to the number of light colors emitted by each light-emitting component. When four colors of light are required, four wires are needed, which increases the overall cost of the light string.

The above content is provided solely for the purpose of assisting in understanding the technical solutions of the present disclosure and does not constitute acknowledgment that the above content constitutes prior art.

SUMMARY OF THE DISCLOSURE

The present disclosure provides a light string, including a power supply cord for connecting a power connector and a plurality of circuit boards;

wherein the power supply cord has a plurality of welding portions, and each circuit board is welded to a corresponding set of the welding portions to electrically connect the circuit board to the power supply cord;

the power supply cord includes a first wire, a second wire, and a third wire, and the first wire, the second wire, and the third wire are arranged in parallel and extend continuously; the first wire, the second wire, and the third wire each have corresponding welding portions that are welded to the plurality of circuit boards;

each circuit board is arranged with a light-emitting assembly, which includes a first light-emitting element, a second light-emitting element, and a third light-emitting element; a positive electrode of the first light-emitting element is connected to the first wire, and a negative electrode of the first light-emitting element is connected in parallel to the second wire and the third wire;

a positive electrode of the second light-emitting element is connected to the second wire, and a negative electrode of the second light-emitting element is connected in parallel to the first wire and the third wire;

a positive electrode of the third light-emitting element is connected to the third wire, and a negative electrode of the third light-emitting element is connected in parallel to the first wire and the second wire.

In some embodiments, a current-limiting resistors is arranged on a connection path of each of the first light-emitting element, the second light-emitting element, and the third light-emitting element.

In some embodiments, each of the first wire, the second wire, and the third wire includes a metal wire core and an insulation layer surrounding the metal wire core; a portion where the welding portion is located on the metal wire core is free from the insulation layer.

In some embodiments, a diameter of the metal wire core is greater than or equal to 0.7 mm and less than or equal to 1 mm.

In some embodiments, each circuit board has a first surface and a second surface facing away from each other, with the light-emitting assembly arranged at a center of the first surface;

the circuit board is arranged with at least three conductive terminals that pass through the circuit board and are spaced apart, with the at least three conductive terminals electrically connected to the light-emitting assembly and facing the light-emitting assembly;

on the second surface, each conductive terminal faces a corresponding solder joint, and each of the first wire, the second wire, and the third wire is welded to a corresponding solder joint.

In some embodiments, the at least three conductive terminals are arranged in parallel along a parallel direction of the first wire, the second wire, and the third wire.

In some embodiments, the light string further includes a plurality of housings, and each circuit board is arranged in an installation cavity of a corresponding housing; a plane where the circuit board is located is defined as a reference plane;

each housing includes a base and a light-transmitting cover, with the light-transmitting cover covering the base, and the base and the light-transmitting cover enclosing to define the installation cavity;

wherein one of the base and the light-transmitting cover has a joining surface, and the other of the base and the light-transmitting cover has a mating surface matching with the joining surface; the joining surface and the mating surface enclose to define a line-crossing passage, and an extension direction of the line-crossing passage is at an angle to the reference plane; the first wire, the second wire, and the third wire are guided and limited through the line-crossing passage in their respective extension directions.

In some embodiments, the joining surface is arranged with a protrusion, and the mating surface defines a recess matching with the protrusion; the line-crossing passage is defined between the protrusion and the recess, causing the line-crossing passage to form an arch shape.

In some embodiments, the base is arranged with a plurality of limiting columns protruding from a wall surface near the light-transmitting cover; the plurality of limiting columns are distributed in a ring around the circuit board at intervals, and a peripheral side of the circuit board abuts against the plurality of limiting columns.

In some embodiments, each limiting column is arranged with a raising column protruding from a wall surface near the circuit board; the circuit board rests on the raising column, for defining an installation space between the circuit board and the base; the welding portion is disposed within the installation space.

BRIEF DESCRIPTION OF THE DRAWINGS

To more clearly illustrate the technical solutions of the embodiments of the present disclosure, the following is a brief introduction to the drawings used in the description of the embodiments. It is obvious that the drawings described below are only some embodiments of the present disclosure. For those skilled in the art, other drawings can be obtained based on the structures shown in these drawings without creative labor.

DETAILED DESCRIPTION

Figure 1:
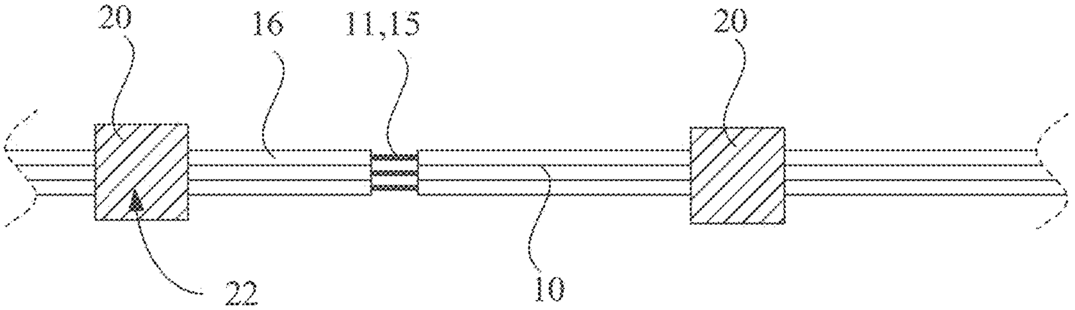
FIG. 1 is a structural schematic view of a light string according to some embodiments of the present disclosure.

The technical solutions in the embodiments of the present disclosure will be described clearly and completely in the following in conjunction with the accompanying drawings in the embodiments of the present disclosure, and it is obvious that the described embodiments are only a part of the embodiments of the present disclosure and not all of the embodiments. Based on the embodiments in the present disclosure, all other embodiments obtained by those skilled in the art without creative labor fall within the scope of the present disclosure. In addition, the technical solutions of different embodiments can be combined with each other, but they must be based on what is achievable by those skilled in the art. When the combination of technical solutions is contradictory or unachievable, such combination of technical solutions shall be deemed not to exist and shall not be included in the scope of protection claimed by the present disclosure.

It should be noted that when the embodiments of the present disclosure involve directional indications (such as up, down, left, right, forward, back . . . ), the directional indications are only intended to explain a relative positional relationship, a movement, etc. between the various components in a particular attitude. When the particular attitude changes, the directional indications are also changed accordingly.

In addition, when the embodiments of the present disclosure contain descriptions involving "first", "second", etc., the descriptions of "first", "second", etc. are intended only for descriptive purposes, and are not to be construed as indicating or implying their relative importance or implicitly specifying the number of the indicated technical features. That is, a feature defined as "first" or "second" may include at least one such feature either explicitly or implicitly. In addition, the meaning of "and/or" in the whole text is to include three concurrent solutions. For example, "A and/or B" includes an A solution, a B solution, and a solution in which A and B are satisfied at the same time.

The present disclosure proposes a light string 100.

In the embodiments of the present disclosure, referring to FIGS. 1 to 7, the light string 100 includes a power supply cord 10 for connecting a power connector and multiple circuit boards 20. The power supply cord 10 has multiple welding portions 11, and each circuit board 20 is welded to a corresponding set of welding portions 11 to electrically connect the circuit board 20 to the power supply cord 10; the power supply cord 10 includes a first wire 12, a second wire 13, and a third wire 14, which are arranged in parallel and extend continuously; the first wire 12, the second wire 13, and the third wire 14 each have corresponding welding portions 11 that are welded to the multiple circuit boards 20; each circuit board 20 is arranged with a light-emitting assembly 21, which includes a first light-emitting element 211, a second light-emitting element 212, and a third light-emitting element 213; a positive electrode of the first light-emitting element 211 is connected to the first wire 12, and a negative electrode of the first light-emitting element 211 is connected in parallel to the second wire 13 and the third wire 14; a positive electrode of the second light-emitting element 212 is connected to the second wire 13, and a negative electrode of the second light-emitting element 212 is connected in parallel to the first wire 12 and the third wire 14; a positive electrode of the third light-emitting element 213 is connected to the third wire 14, and a negative electrode of the third light-emitting element 213 is connected in parallel to the first wire 12 and the second wire 13.

In the embodiments, the power supply cord 10 is a conductive component configured to connect the power supply connector to the circuit boards 20 in the light string 100. Its function is to transmit current from the power supply to the individual luminous units or circuit boards 20 to power the light-emitting assembly 21. The power supply cord 10 includes multiple wires, which may be made of copper wire or other conductive materials to ensure good conductivity. To ensure the safety and stability of the circuit, the power supply cord 10 is often wrapped with an insulation layer 16 to prevent short circuits or electric shock hazards.

The welding portion 11 is a part of the power supply cord 10 that has been processed for connection to a corresponding circuit board 20. The welding portion 11 may be a part of the power supply cord 10 where the insulation layer 16 has been removed to expose the conductive material for welding. The welding portion 11 may be an exposed wire end, which is a conductive part remaining after the outer layer of the power supply cord 10 is stripped. This part is connected to electrodes on the circuit board 20 via methods such as heat pressing or welding.

The circuit board 20 is a substrate for mounting electrical components such as the light-emitting assembly 21, and it connects the power supply cord 10 to the light-emitting assembly 21 via circuit connections. The circuit board 20 may be a rigid board to ensure stable installation of the light-emitting assembly 21 on the circuit board 20.

The light-emitting assembly 21 is a core element providing a lighting effect in the light string 100, which may include multiple light-emitting elements, each capable of emitting light of a specific color. The light-emitting assembly 21 includes at least three light-emitting elements, which may be LEDs. Each light-emitting element includes a positive electrode and a negative electrode to control the flow of current and its light-emitting effect. To enable the light string 100 to produce multiple colors, the light-emitting elements may be adopted with RGB LED technology to separately control the three light-emitting colors of red, green, and blue. In other words, for example, the first light-emitting element 211 emits red light, the second light-emitting element 212 emits green light, and the third light-emitting element 213 emits blue light. The first light-emitting element 211, the second light-emitting element 212, and the third light-emitting element 213 alternate in emitting light, with the three light-emitting components rapidly flashing to display white light. In some embodiments, the light-emitting assembly 21 may include four light-emitting elements, and the power supply cord 10 may include four wires to emit five colors of light. In other embodiments, the light-emitting assembly 21 may include five light-emitting elements, and the power supply cord 10 may include five wires to emit six colors of light. Same is true for other number of colors of light. That is, N light-emitting elements correspond to N wires to emit N+1 colors of light.

The light-emitting principle of the light string 100 in the embodiments adopts the principle of alternating positive and negative electrodes. Specifically, the positive electrode of the first light-emitting element 211 is connected to the first wire 12, and the negative electrode is connected in parallel to the second wire 13 and the third wire 14, i.e., the second wire 13 or the third wire 14 can serve as the negative electrode of the first light-emitting element 211; the positive electrode of the second light-emitting element 212 is connected to the second wire 13, and the negative electrode is connected in parallel to the first wire 12 and the third wire 14, i.e., the first wire 12 or the third wire 14 can serve as the negative electrode of the second light-emitting element 212; the positive electrode of the third light-emitting element 213 is connected to the third wire 14, and the negative electrode is connected in parallel to the first wire 12 and the second wire 13, i.e., the first wire 12 or the second wire 13 can serve as the negative electrode of the third light-emitting element 213.

The light string 100 of the present disclosure achieves electrical connectivity by arranging multiple wire of the power supply cord 10 in a parallel, continuously extended configuration. This eliminates the need to individually weld multiple power supply cords 10 to each circuit board 20, instead, electrical connectivity can be achieved through a small number of solder joints 25, which reduces the number of solder joints 25 and the time required for welding, thereby improving assembly efficiency. For example, in the related art, when there are three wires arranged, six solder joints are required to connect the circuit. In the embodiments of the present disclosure, however, only three solder joints 25 are needed to connect the circuit, reducing the cost of welding at the solder joints 25 and the welding time, thereby improving assembly efficiency.

In addition, the light string 100 of the present disclosure can use three wires to achieve four colors of light. For example, the first light-emitting element 211 emits red light, the second light-emitting element 212 emits green light, and the third light-emitting element 213 emits blue light. The first light-emitting element 211, the second light-emitting element 212, and the third light-emitting element 213 emit light in turn, and the three light-emitting elements flash rapidly to display white light. Compared to the related art, where the number of light colors corresponds to the number of wires, the present embodiments may save the cost of one wire, thereby reducing the overall cost of the light string 100.

In some embodiments, a current-limiting resistors 30 is arranged on a connection path of each of the first light-emitting element 211, the second light-emitting element 212, and the third light-emitting element 213 to control the current flowing through each light-emitting element, thereby ensuring the normal operation of the light-emitting elements and preventing damage to the light-emitting elements due to excessive current. For example, the current-limiting resistor 30 may be connected to the positive or negative electrode of the light-emitting element, which is not limited herein. In some embodiments, the resistance value of the current-limiting resistor 30 is 2.2 kΩ to ensure the current of the light-emitting element.

In some embodiments, the first wire 12, the second wire 13, and the third wire 14 each include a metal wire core 15 and an insulation layer 16 surrounding the metal wire core 15. A portion of the insulation layer 16 is stripped to expose the metal wire core 15, thereby forming the welding portion 11.

In the embodiments, the metal wire core 15 is responsible for current conduction and may be made of highly conductive metallic materials such as copper or aluminum. The metal wire core 15 may be formed from multiple copper wires or aluminum wires, or from a single copper wire or aluminum wire, without limitation. The insulation layer 16 is a material wrapped around the metal wire core 15, serving to prevent current leakage, short circuits, electric shocks, and other safety hazards. The insulation layer 16 may be made of flexible plastic, rubber, or other non-conductive materials, which have good insulation properties and resistance to aging.

At a connection portion of the power supply cord 10, the insulation layer 16 is stripped to expose the metal wire core 15, thereby forming the welding portion 11. The welding portion 11 is configured to establish an electrical connection with the circuit board 20, ensuring current transmission between the power supply cord 10 and the circuit board 20. The insulation layer 16 may be stripped using a mechanical wire stripper or manually.

In circuit connections, the design of stripping the insulation layer 16 and exposing the metal wire core 15 to form the welding portion 11 makes the connection of the power supply cord 10 simpler and more efficient. In practice, each wire of the power supply cord 10 is connected to a corresponding solder joint 25 on the circuit board 20 via the welding portion 11. Each welding portion 11 of each wire corresponds to a different solder joint 25 on a corresponding circuit board 20, ensuring that current flows stably and drives the light-emitting members. In this way, the multiple circuit boards 20 can be quickly welded to the power supply cord 10 without interrupting the power supply, thereby improving assembly efficiency.

In some embodiments, the metal wire core 15 is a thick copper wire. A thick copper wire refers to a copper wire with a larger diameter. Specifically, the diameter of the thick copper wire is greater than or equal to 0.7 mm and less than or equal to 1 mm, such as 0.7 mm, 0.9 mm, 1 mm, or 1.2 mm. Compared to thin copper wires, the thick copper wire can carry a larger current and is less susceptible to external forces, maintaining its shape and conductivity. In the illustrated embodiments, the insulation layer 16 is stripped using a mechanical wire stripping machine, exposing a part of the metal wire core 15. During the stripping process, the mechanical wire stripping machine can precisely remove the insulation layer 16 of the power supply cord 10, ensuring that the metal wire core 15 is exposed sufficiently for connection. Since the thick copper wire is applied, the operation of the wire stripping machine is more stable, reducing the risk of the copper wire being cut due to its thinness.

Figure 2:
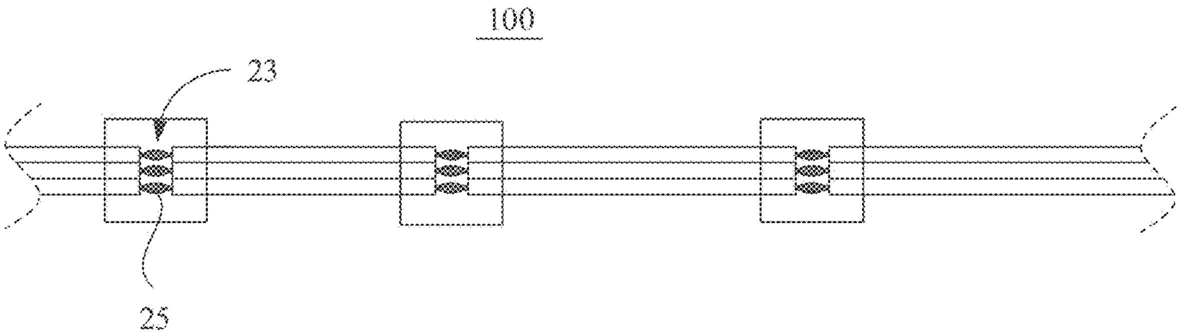
FIG. 2 is a structural schematic view of the light string as shown in FIG. 1 on an opposite side.
Figure 3:
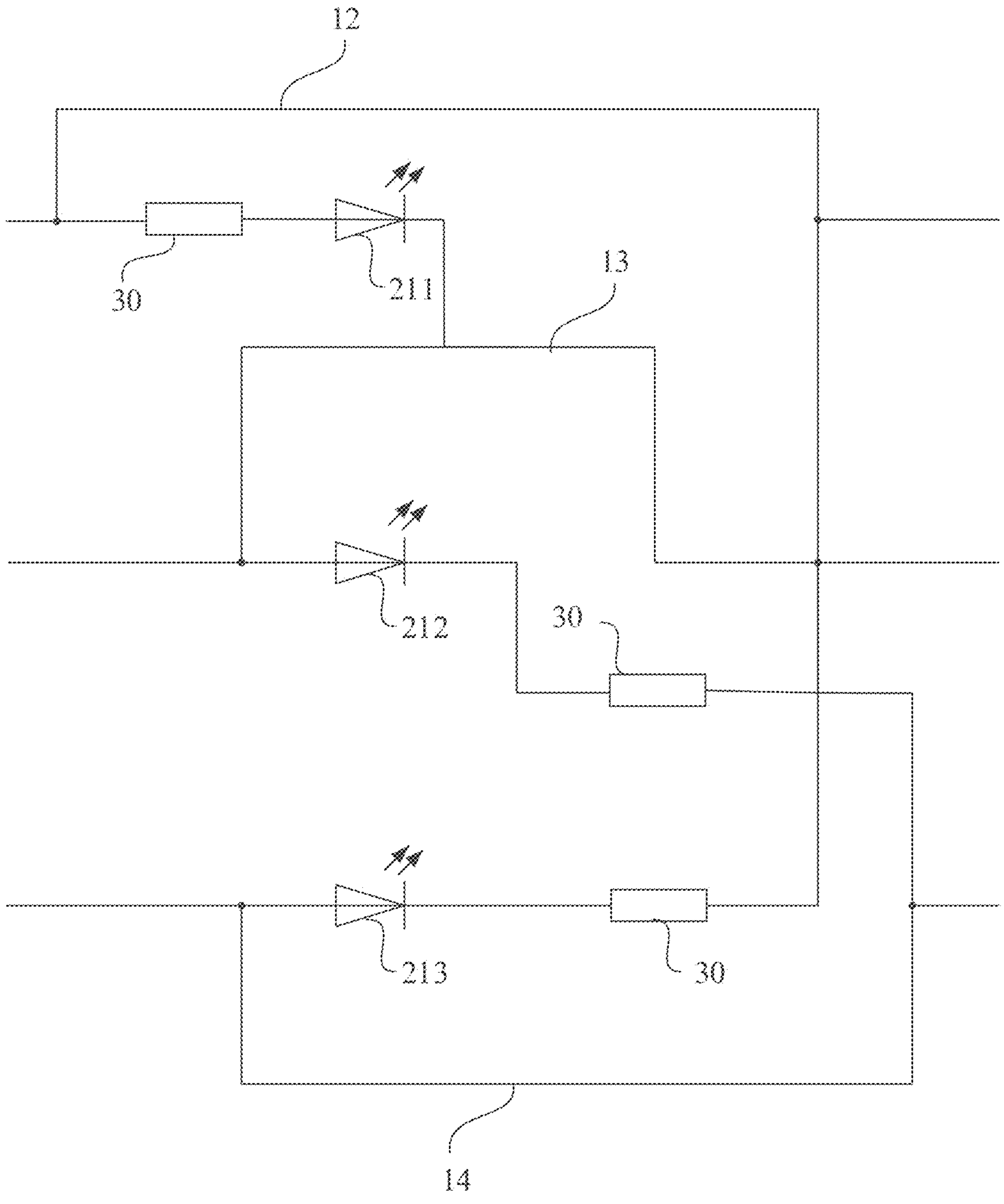
FIG. 3 is a circuit diagram of a light string according to some embodiments of the present disclosure.
Figure 4:
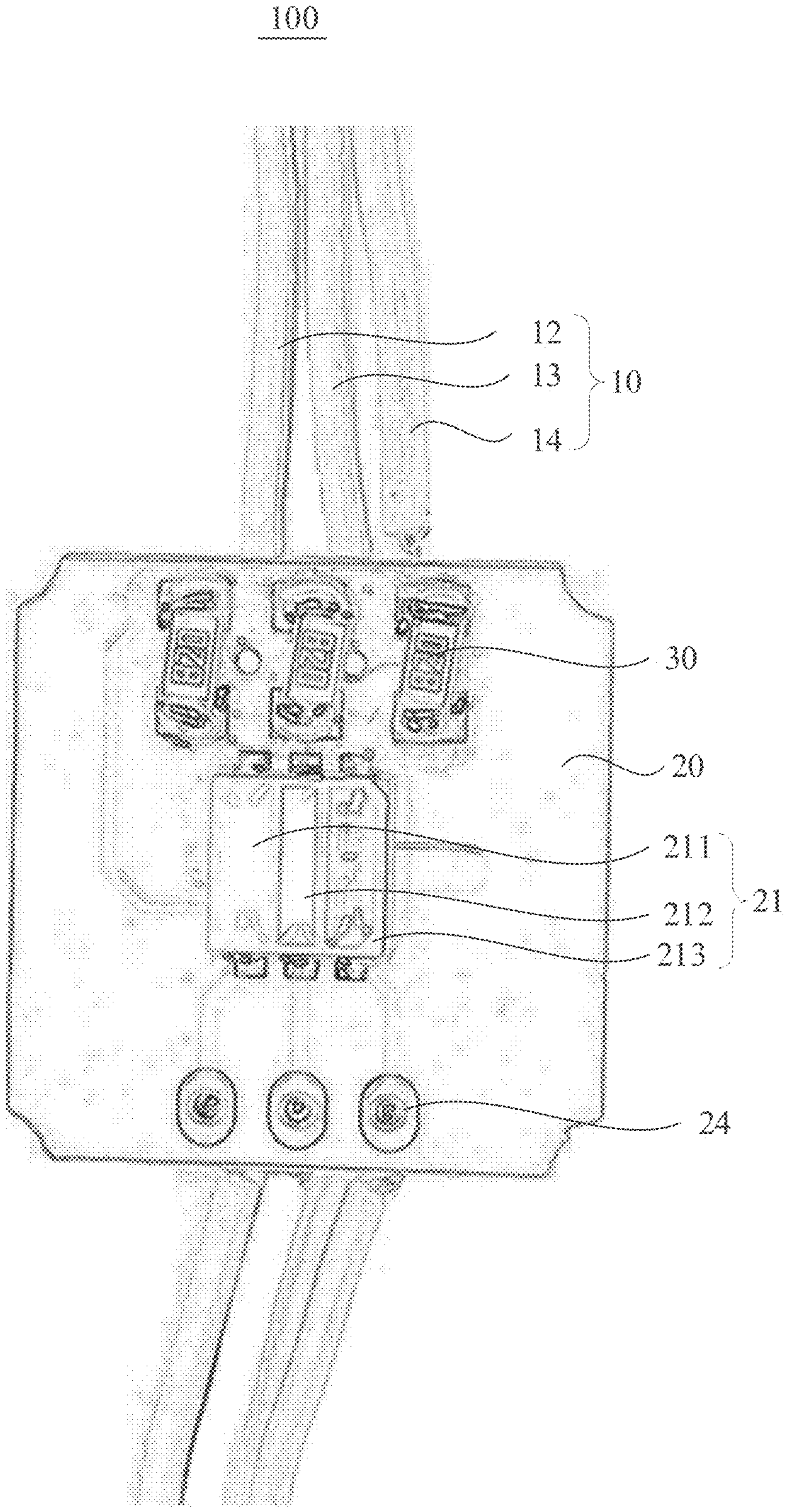
FIG. 4 is a photo illustrating a first side of a circuit board of a light string according to some embodiments of the present disclosure.
Figure 5:
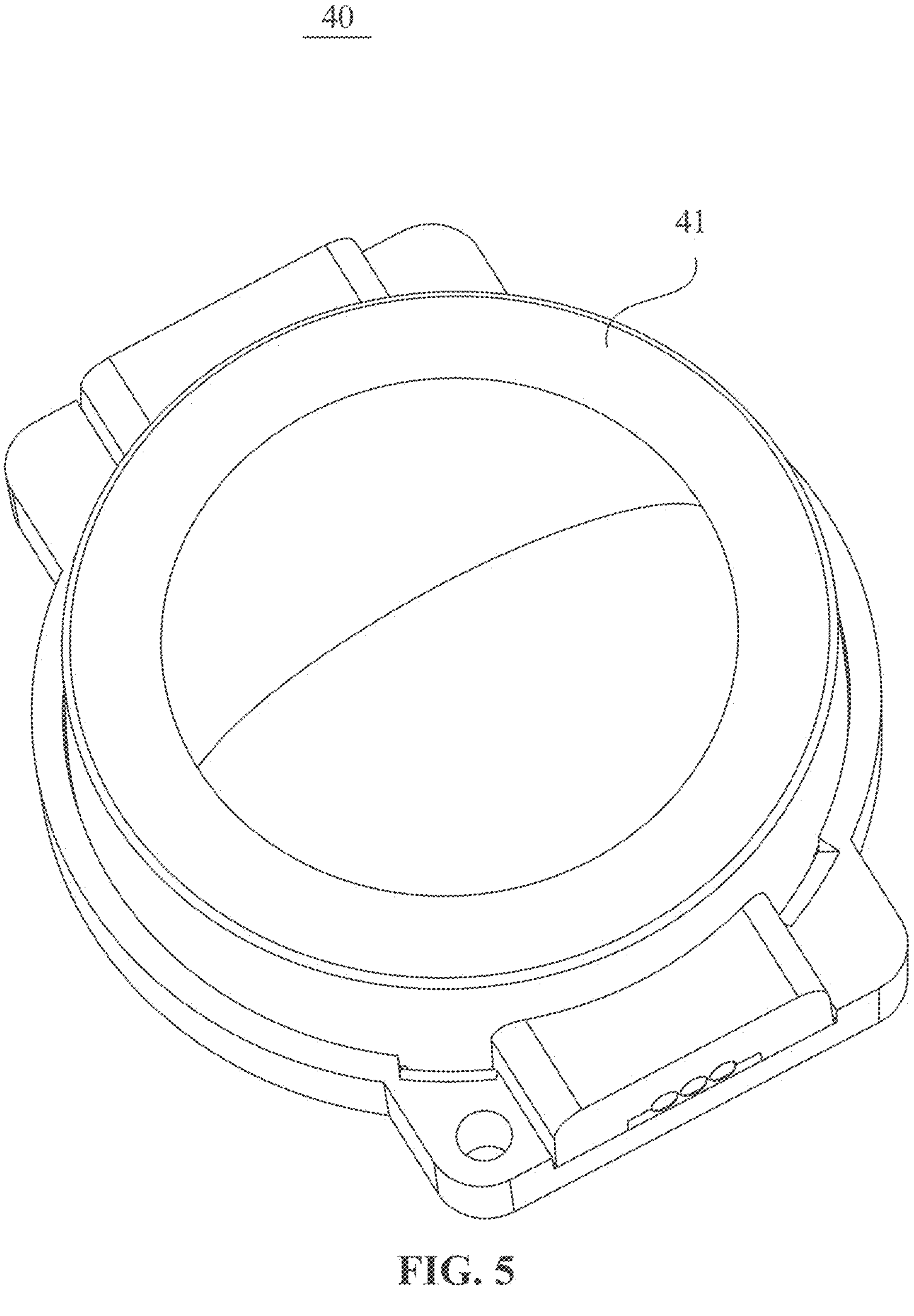
FIG. 5 is a structural schematic view of a housing of a light string according to some embodiments of the present disclosure.
Figure 6:
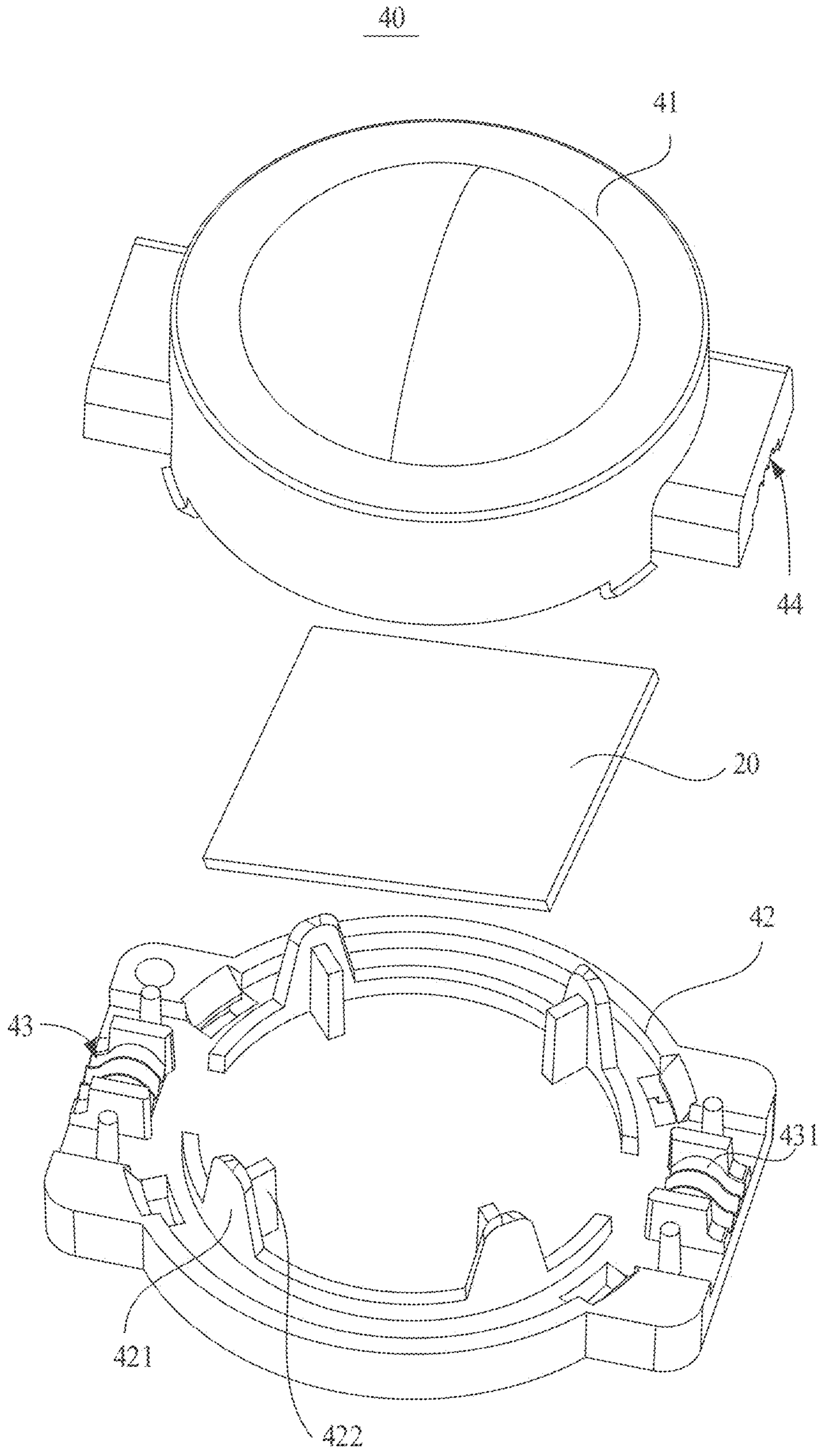
FIG. 6 is an exploded view of a housing of a light string according to some embodiments of the present disclosure.
Figure 7:
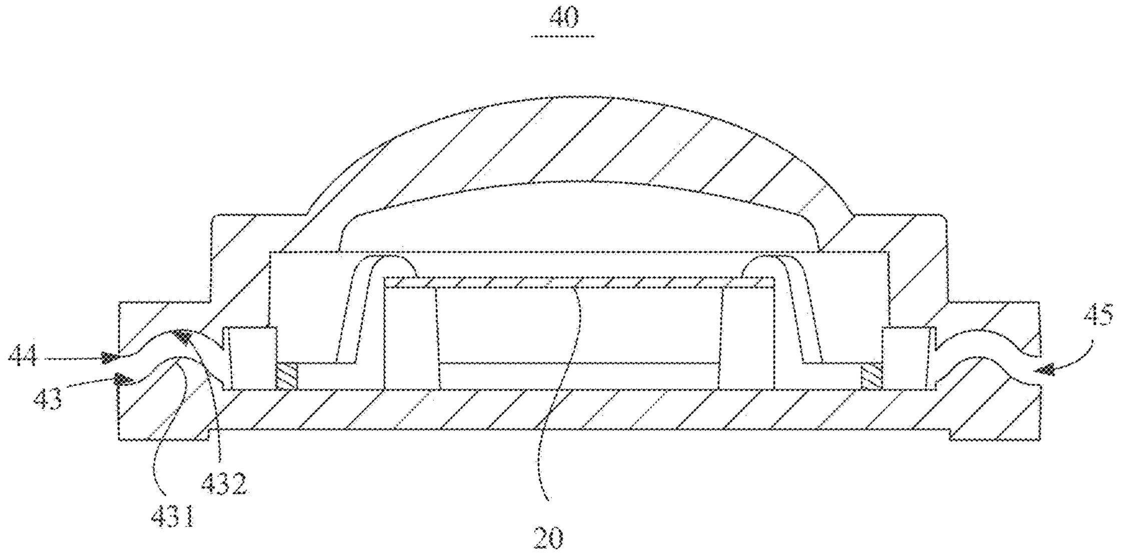
FIG. 7 is a cross-sectional view of a housing of a light string according to some embodiments of the present disclosure.
Figure 8:
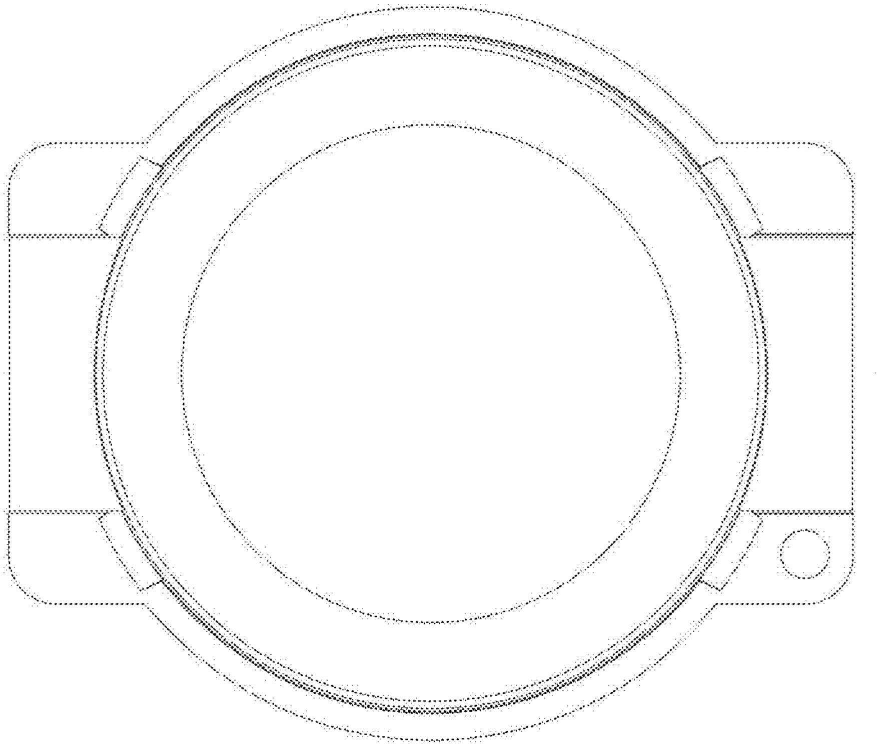
FIG. 8 is a front view of a housing of a light string according to some embodiments of the present disclosure.
Figure 9:
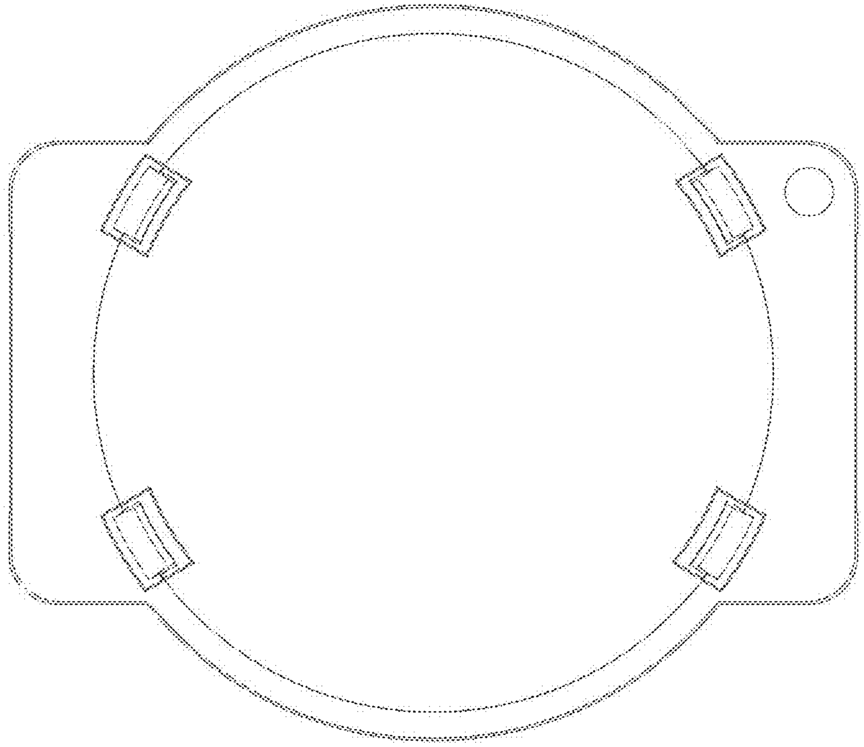
FIG. 9 is a rear view of a housing of a light string according to some embodiments of the present disclosure.
Figure 10:
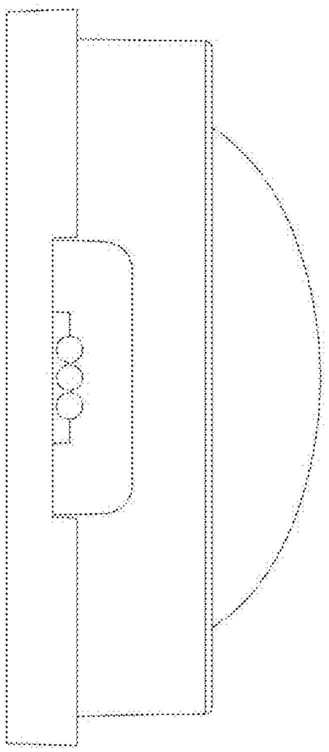
FIG. 10 is a left view of a housing of a light string according to some embodiments of the present disclosure.
Figure 11:
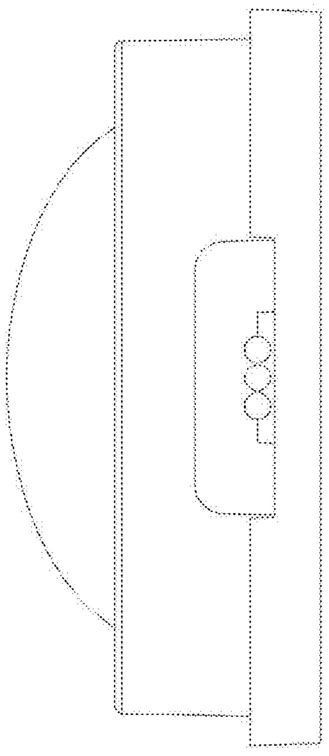
FIG. 11 is a right view of a housing of a light string according to some embodiments of the present disclosure.
Figure 12:
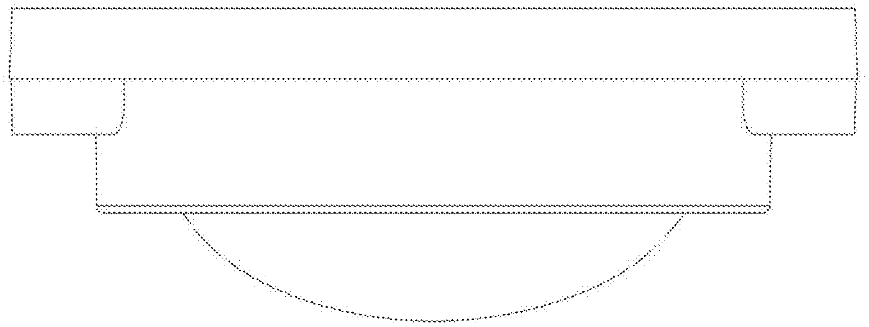
FIG. 12 is a top view of a housing of a light string according to some embodiments of the present disclosure.
Figure 13:
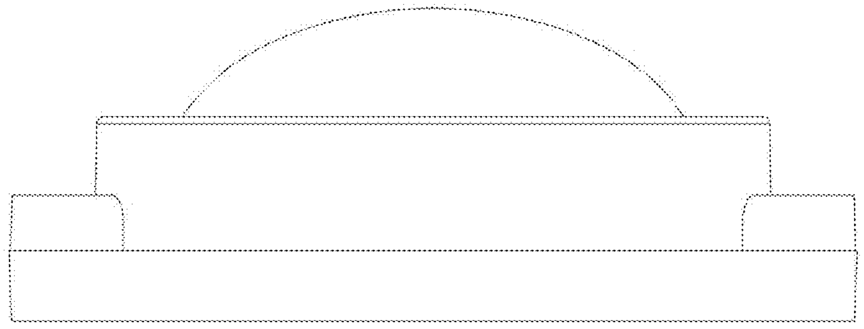
FIG. 13 is a bottom view of a housing of a light string according to some embodiments of the present disclosure.

In some embodiments, referring to FIGS. 2 and 4, the circuit board 20 has a first surface 22 and a second surface 23 facing away from each other, with the light-emitting assembly 21 arranged at a center of the first surface 22; the circuit board 20 is arranged with at least three conductive terminals 24 that pass through the circuit board 20 and are spaced apart, with the conductive terminals 24 electrically connected to the light-emitting assembly 21 and facing the light-emitting assembly 21; on the second surface 23, each conductive terminal 24 faces a corresponding solder joint 25, and each of the first wire 12, the second wire 13, and the third wire 14 is welded to a corresponding solder joint 25.

In the embodiments, the circuit board 20 has two surfaces, where the first surface 22 is configured to install the light-emitting assembly 21, and the second surface 23 is arranged with the solder joints 25 for connection to the power supply cord 10, which effectively utilizes both sides of the circuit board 20 for layout, thereby increasing space utilization.

The circuit board 20 is arranged with at least three conductive terminals 24 that pass through the circuit board 20. These terminals are disposed on the circuit board 20 and are spaced apart. Each conductive terminal 24 is electrically connected to the light-emitting assembly 21, ensuring that each light-emitting element is connected to the power supply cord 10 via an independent terminal. Additionally, the conductive terminals 24 are positioned facing the light-emitting assembly 21, i.e., the conductive terminals 24 are located at the center of the second surface 23, thereby reducing the distance between the conductive terminals 24 and the light-emitting assembly 21 and thus simplifying the wiring process. In addition, the solder joint 25 is located at the center of the second surface 23, such that the distance from the welding portion 11 to the relative ends of the power supply cord 10 on the circuit board 20 is the same, ensuring uniform force distribution on the power supply cord 10 and thereby enhancing the stability of its connection to the circuit board 20.

Each conductive terminal 24 is connected to the light-emitting assembly 21 at one end and to the power supply cord 10 at the other end via the solder joint 25. When the welding portion 11 of the power supply cord 10 is connected to the solder joint 25, a stable electrical path is formed, ensuring that current is transmitted stably to each light-emitting element.

Furthermore, the multiple conductive terminals 24 are arranged in parallel along a parallel direction of the first wire 12, the second wire 13, and the third wire 14, meaning that the multiple conductive terminals 24 are located in the same row on the circuit board 20, thereby forming a parallel layout. Since the solder joints 25 face and correspond to the conductive terminals 24, the solder joints 25 of the first wire 12, the second wire 13, and the third wire 14 corresponding to a same circuit board 20 are located at the same position. This allows the wire stripping machine to simultaneously strip the insulation layers 16 of the three wires at the same position, thereby improving production efficiency.

In some embodiments, referring to FIGS. 5 to 13, the light string 100 further includes multiple housings 40, with each circuit board 20 arranged in an installation cavity of a corresponding housing 40, and a plane where the circuit board 20 is located is defined as a reference plane; the housing 40 includes a base 42 and a light-transmitting cover 41, with the light-transmitting cover 41 covering the base 42, and the base 42 and the light-transmitting cover 41 enclosing to define the installation cavity; one of the base 42 and the light-transmitting cover 41 has a joining surface 43, and the other of the base 42 and the light-transmitting cover 41 has a mating surface 44 matching with the joining surface 43. The joining surface 43 and the mating surface 44 enclose to define a line-crossing passage 45, and an extension direction of the line-crossing passage 45 is at an angle to the reference plane. The first wire 12, the second wire 13, and the third wire 14 are guided and limited through the line-crossing passage 45 in their respective extension directions.

In the embodiments, the housing 40 includes the base 42 and the light-transmitting cover 41. The light-transmitting cover 41 is arranged on the base 42, and the two enclose to define the installation cavity for accommodating the circuit board 20 and its related components. This design may protect the circuit board 20 from external environmental influences, and through the design of the light-transmitting cover 41, the lighting effect of the light-emitting assemblies 21 may be better presented.

The base 42 and the light-transmitting cover 41 are connected via the joining surface 43 and the mating surface 44, which enclose to define the line-crossing passage 45 for routing wires, and the wires are fixedly limited within the line-crossing passage 45. This fixes the position of the circuit board 20 within the housing 40, preventing the wires from being pulled and causing the solder at the solder joints 25 to detach, which could lead to circuit disconnection, thereby ensuring the stable transmission of the power supply cord 10. For example, the extension direction of the line-crossing passage 45 forms an angle with the reference plane, meaning that the wires form a bent structure in the extension direction, thereby increasing the friction between the wires and the housing 40, preventing the wires from freely sliding, and thus ensuring the positional stability of the circuit board 20. Furthermore, the line-crossing passage 45 may include a bent segment to further increase the bent structure, thereby limiting and fixing the wires within the line-crossing passage 45. The line-crossing passage 45 may be coated with a material that increases friction to fix the position of the wires. The specific method of limiting and passing the wires is not restricted herein.

In some embodiments, the joining surface 43 is arranged with a protrusion 431, and the mating surface 44 defines a recess 432 matching with the protrusion 431. The line-crossing passage 45 is defined between the protrusion 431 and the recess 432, causing the line-crossing passage 45 to form an arch shape.

In the embodiments, the protrusion 431 is arranged on the joining surface 43, and the recess 432 is defined correspondingly on the mating surface 44. Through the engagement of the protrusion 431 and the recess 432, a physically bent region is formed. With the line-crossing passage 45 located within this region, the line-crossing passage 45 forms an arch shape, which may guide the wires through the bent structure, constraining them during passage to prevent arbitrary movement, thereby ensuring the stability of the wires within the line-crossing passage 45. In other words, the bent structure effectively prevents wire loosening or displacement, enhancing wire stability and ensuring the secure connection between the circuit board 20 and the housing 40.

In some embodiments, the base 42 is arranged with multiple limiting columns 421 protruding from a wall surface near the light-transmitting cover 41. The multiple limiting columns 421 are distributed in a ring around the circuit board 20 at intervals, and a peripheral side of the circuit board 20 abuts against the multiple limiting columns 421.

In the embodiments, the base 42 is arranged with multiple limiting columns 421 protruding from the wall surface near the light-transmitting cover 41. These limiting columns 421 are arranged in a spaced-apart, annular configuration around the circuit board 20, and the peripheral side of the circuit board 20 is in limiting contact with the limiting columns 421 to securely fix the circuit board 20 within the housing 40 and prevent it from loosening.

Furthermore, each limiting column 421 is arranged with a raising column 422 protruding from a wall surface near the circuit board 20. The circuit board 20 rests on the raising column 422, thereby defining an installation space between the circuit board 20 and the base 42. The welding portion 11 is disposed within the installation space.

In the embodiments, by providing the raising column 422 on the limiting column 421 near the wall surface of the circuit board 20, an installation space is defined between the circuit board 20 and the base 42 to accommodate the welding portion 11 on the circuit board 20, i.e., the welded connection between the power supply cord 10 and the circuit board 20, thereby ensuring that the welding portion 11 does not come into direct contact with the base 42 and avoiding damage to the welding portion 11 due to pressure or friction.

Finally, it should be noted that the above embodiments are provided to illustrate the technical solutions of the present disclosure and are not intended to limit them. Although the present disclosure has been described in detail with reference to the aforementioned embodiments, those skilled in the art will understand that modifications may be made to the technical solutions described in the aforementioned embodiments, or equivalent replacements may be made to some of the technical features; such modifications or replacements do not cause the corresponding technical solutions to deviate from the spirit and scope of the technical solutions of the present disclosure.

What is claimed is:

1. A light string, comprising a power supply cord for connecting a power connector, a plurality of circuit boards, and a plurality of housings;

wherein the power supply cord has a plurality of welding portions, and each of the plurality of circuit boards is welded to a corresponding set of the plurality of welding portions to electrically connect each of the plurality of circuit boards to the power supply cord;

the power supply cord comprises a first wire, a second wire, and a third wire, and the first wire, the second wire, and the third wire are arranged in parallel and extend continuously; the first wire, the second wire, and the third wire each has a corresponding welding portion that are welded to the plurality of circuit boards;

each of the plurality of circuit boards is arranged with a light-emitting assembly, which comprises a first light-emitting element, a second light-emitting element, and a third light-emitting element; a positive electrode of the first light-emitting element is connected to the first wire, and a negative electrode of the first light-emitting element is connected in parallel to the second wire and the third wire;

a positive electrode of the second light-emitting element is connected to the second wire, and a negative electrode of the second light-emitting element is connected in parallel to the first wire and the third wire;

a positive electrode of the third light-emitting element is connected to the third wire, and a negative electrode of the third light-emitting element is connected in parallel to the first wire and the second wire;

each of the plurality of circuit boards is arranged in an installation cavity of a corresponding one of the plurality of housings; a plane where a corresponding one of the plurality of circuit boards is located is defined as a reference plane;

each of the plurality of housings comprises a base and a light-transmitting cover;

one of the base or the light-transmitting cover has a joining surface, and the other of the base or the light-transmitting cover has a mating surface matching with the joining surface; the joining surface and the mating surface enclose to define a line-crossing passage, and an extension direction of the line-crossing passage is at an angle to the reference plane; the first wire, the second wire, and the third wire are guided and limited through the line-crossing passage in respective extension directions of the first wire, the second wire, and the third wire;

each of the plurality of circuit boards has a first surface and a second surface facing away from each other, with the light-emitting assembly arranged at a center of the first surface;

each of the plurality of circuit boards is arranged with at least three conductive terminals that pass through the circuit board and are spaced apart, with the at least three conductive terminals electrically connected to the light-emitting assembly and facing the light-emitting assembly; and on the second surface, each of the at least three conductive terminals faces a corresponding solder joint, and each of the first wire, the second wire, and the third wire is welded to a corresponding solder joint.

2. The light string according to claim 1, wherein a current-limiting resistor is arranged on a connection path of each of the first light-emitting element, the second light-emitting element, and the third light-emitting element.

3. The light string according to claim 1, wherein each of the first wire, the second wire, and the third wire comprises a metal wire core and an insulation layer surrounding the metal wire core; a portion where the corresponding welding portion is located on the metal wire core is free from the insulation layer.

4. The light string according to claim 3, wherein a diameter of the metal wire core is greater than or equal to 0.7 mm and less than or equal to 1 mm.

5. The light string according to claim 1, wherein the at least three conductive terminals are arranged in parallel along a parallel direction of the first wire, the second wire, and the third wire.

6. The light string according to claim 1, wherein the light-transmitting cover covers the base, and the base and the light-transmitting cover enclosing to define the installation cavity.

7. The light string according to claim 6, wherein a current-limiting resistor is arranged on a connection path of each of the first light-emitting element, the second light-emitting element, and the third light-emitting element.

8. The light string according to claim 6, wherein each of the first wire, the second wire, and the third wire comprises a metal wire core and an insulation layer surrounding the metal wire core; a portion where the corresponding welding portion is located on the metal wire core is free from the insulation layer.

9. The light string according to claim 8, wherein a diameter of the metal wire core is greater than or equal to 0.7 mm and less than or equal to 1 mm.

10. The light string according to claim 1, wherein the joining surface is arranged with a protrusion, and the mating surface defines a recess matching with the protrusion; the line-crossing passage is defined between the protrusion and the recess, causing the line-crossing passage to form an arch shape.

11. The light string according to claim 1, wherein the base is arranged with a plurality of limiting columns protruding from a wall surface near the light-transmitting cover; the plurality of limiting columns are distributed in a ring around the corresponding one of the plurality of circuit boards at intervals, and a peripheral side of the corresponding one of the plurality of circuit boards abuts against the plurality of limiting columns.

12. The light string according to claim 11, wherein each of the plurality of limiting columns is arranged with a raising column protruding from a wall surface near the corresponding one of the plurality of circuit boards; the corresponding one of the plurality of circuit boards rests on the raising column, for defining an installation space between the corresponding one of the plurality of circuit boards and the base; the corresponding welding portion is disposed within the installation space.

* * * * *